United States Patent
Lofthouse (10) Patent No.: US 10,084,376 B2
(45) Date of Patent: Sep. 25, 2018

(54) CIRCUIT WITH MULTIPLE OUTPUT POWER CONVERTER

(71) Applicant: Silicon Laboratories Inc., Austin, TX (US)

(72) Inventor: Sean A. Lofthouse, Pflugerville, TX (US)

(73) Assignee: SILICON LABORATORIES INC., Austin, TX (US)

( * ) Notice: Subject to any disclaimer, the term of this patent is extended or adjusted under 35 U.S.C. 154(b) by 1235 days.

(21) Appl. No.: 13/917,387

(22) Filed: Jun. 13, 2013

(65) Prior Publication Data
US 2014/0368035 A1  Dec. 18, 2014

(51) Int. Cl.
*H02M 3/155* (2006.01)
*H02M 1/00* (2006.01)

(52) U.S. Cl.
CPC ...... *H02M 3/155* (2013.01); *H02M 2001/009* (2013.01); *H02M 2001/0045* (2013.01); *Y10T 307/406* (2015.04)

(58) Field of Classification Search
CPC ............. H02J 1/102; H02J 3/36; H04M 1/738
USPC ......................................................... 307/82
See application file for complete search history.

(56) References Cited

U.S. PATENT DOCUMENTS

| | | | |
|---|---|---|---|
| 2009/0040794 A1* | 2/2009 | Williams | H02M 3/1588 363/21.14 |
| 2009/0243572 A1* | 10/2009 | Mills | H02M 3/155 323/282 |
| 2012/0002800 A1 | 1/2012 | Lofthouse | |
| 2012/0098333 A1* | 4/2012 | Zhou | H02M 3/33561 307/11 |

OTHER PUBLICATIONS

Dongwon Kwon and Gabriel A. Rincon-Mora; "Single-Inductor-Multiple-Output Switching DC-DC Converters," IEEE Transactions on Circuits and Systems—II: Express Briefs, vol. 56, No. 8, pp. 614 to 618, Aug. 2009.
Silicon Laboratories Inc.; "Single-Chip Dual ProSLIC," Technical Data Sheet, Si32260/61, 2 Pages, Jul. 8, 2011.
Silicon Laboratories Inc.; "ProSLIC Programmable CMOS SLIC/Codec with Ringing/Battery Voltage Generation," Technical Data Sheet, Si3210/Si3211, Rev. 1.61, 148 Pages, Jan. 2012.

\* cited by examiner

*Primary Examiner* — Alfonso Perez Borroto
(74) *Attorney, Agent, or Firm* — Polansky & Associates, P.L.L.C.; Paul J. Polansky (57) ABSTRACT

A circuit such as a subscriber line interface circuit (SLIC) has a multiple output power converter including an inductive converter, a first passive rectifier, a first capacitor, and a second passive rectifier. The inductive converter has a voltage input terminal for receiving an input voltage, and a voltage output terminal. The first passive rectifier has an input coupled to the voltage output terminal of the inductive power converter, and an output for providing a first power supply voltage. The first capacitor has a first terminal coupled to the output terminal of the inductive converter, and a second terminal. The second passive rectifier has an input coupled to the second terminal of the first capacitor, and an output terminal for providing a second power supply voltage different from the first power supply voltage.

20 Claims, 5 Drawing Sheets

CIRCUIT WITH MULTIPLE OUTPUT POWER CONVERTER

FIELD OF THE DISCLOSURE

The present disclosure relates generally to power converters, and more particularly to circuits with power converters for two or more power supply voltages.

BACKGROUND

Subscriber line interface circuits are typically found in the central office exchange of a telecommunications network. A subscriber line interface circuit (SLIC) provides a communications interface between the digital switching network of a central office and an analog subscriber line. The analog subscriber line connects to a subscriber station or telephone instrument at a location remote from the central office exchange.

The analog subscriber line and subscriber equipment form a subscriber loop. The interface requirements of a SLIC result in the need to provide relatively high voltages and currents for control signaling with respect to the subscriber equipment on the subscriber loop. Voiceband communications are low voltage analog signals on the subscriber loop. Thus the SLIC detects and transforms low voltage analog signals into digital data for transmitting communications received from the subscriber equipment to the digital network. For bi-directional communication, the SLIC also transforms digital data received from the digital network into low voltage analog signals for transmission on the subscriber loop to the subscriber equipment.

The SLIC is provided with a negative voltage supply sufficient to accommodate the most negative loop voltage while maintaining the SLIC internal circuitry in their normal region of operation. In order to ensure sufficient supply levels, a power supply providing a constant or fixed supply level sufficient to meet or exceed the requirements of these states may be provided. However, such solutions invariably result in wasted power for at least some operational states.

One supply level is required when the subscriber equipment is "on hook" and another supply level is required when the subscriber equipment is "off hook". Yet another supply level is required for "ringing". A SLIC thus requires different power supply levels depending upon its operational state.

One disadvantage of a single, fixed power supply architecture is that excess power is generated and is dissipated as heat or otherwise wasted when a SLIC is not using a power supply level optimized for its particular operational state or for the particular line conditions. For example, the power supply is capable of supporting the worst-case scenario such as a maximum subscriber line length provided for by specification. In the event the subscriber line is considerably shorter than the maximum expected length, the SLIC will be required to absorb the excess power. The resulting additional thermal load can be problematic for integrated circuits of the SLIC.

One alternative to a single fixed supply is to utilize two fixed supplies. SLIC control circuitry selects between the two fixed supplies based upon operational mode. This approach reduces the amount of excess power wasted at the expense of the operational mode based control circuitry and maintaining two fixed supplies.

More recent architectures utilize switching circuitry (e.g., a DC-DC converter) to generate the appropriate supply level (known as "VBAT") from another fixed supply. The switching circuitry can be controlled to track the level needed by the SLIC and provide a variable VBAT. Instead of multiple fixed power supplies to accommodate the different operational states, a single tracking supply varies its output VBAT to meet the SLIC's needs.

Moreover the operational states of individual subscriber lines are inherently independent of each other. Each subscriber line may be referred to as a SLIC channel. Each SLIC channel is associated with its own linefeed driver. Providing a single shared fixed supply or providing a shared tracking supply that caters to the neediest channel inherently results in wasted power and heat for devices or channels that do not have the same requirements. Prior art solutions provide separate switching circuitry for each channel or device to reduce the amount of wasted power and heat generation. Each tracking power supply varies its VBAT supply level in accordance with the requirements of its associated channel or device. This tracking power supply architecture is more power efficient than the shared fixed power supply architecture. Given that a tracking power supply is utilized for each channel, however, such an architecture may not be economical to implement—particularly with respect to a large number of channels.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

A multiple output power converter as described herein is inexpensive and suitable for multiple applications, for example in a subscriber line interface circuit (SLIC) that drives two or more subscriber loops with independent supplies. The multiple output power converter is based on a single inductor instead of a transformer, and uses passive rectifiers to avoid the need for expensive switching transistors. The multiple output power converter generally includes an inductive converter that may be used in a boost, buck/boost, or other known configuration. The multiple output power converter uses a first passive rectifier connected to the output terminal of the inductive converter to provide a first power supply voltage and a feedback to the inductive converter. The multiple output power converter forms a second power supply voltage using a capacitor and a second passive rectifier. In some embodiments, such a converter also includes a linear regulator between the outputs to further regulate the second power supply voltage.

Figure 1:
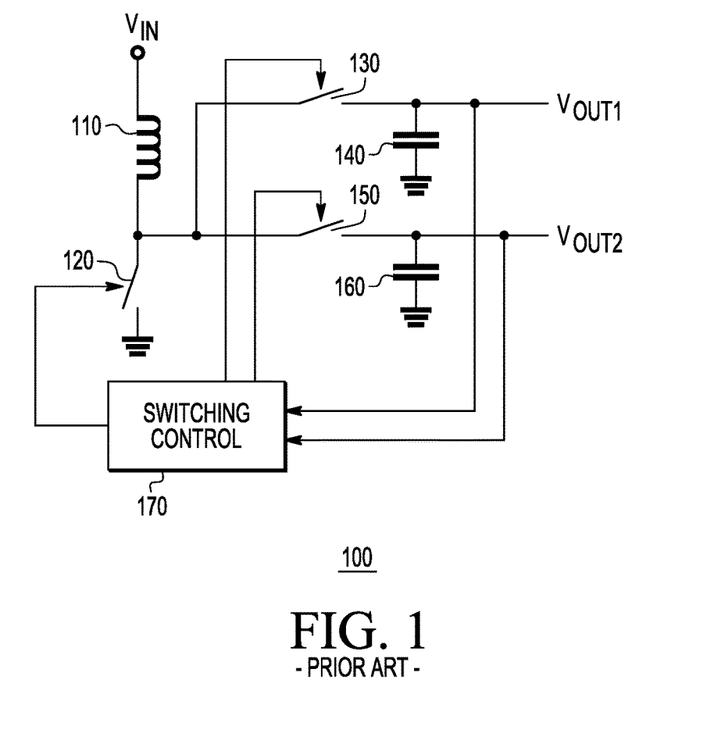
FIG. 1 illustrates in partial block diagram and partial schematic form a multiple output power converter known in the prior art.

FIG. 1 illustrates in partial block diagram and partial schematic form a multiple output power supply 100 known in the prior art. Multiple output power supply 100 includes an inductor 110, a switch 120, a switch 130, a capacitor 140, a switch 150, a capacitor 160, and a switching control block 170. Inductor 110 has a first terminal for receiving an input voltage labeled "$V_{IN}$", and a second terminal. Switch 120 has a first terminal connected to the second terminal of inductor 110, a second terminal connected to ground, and a control terminal. Switch 130 has a first terminal connected to the second terminal of inductor 110, a second terminal for providing a power supply voltage labeled "$V_{OUT1}$", and a control terminal. Capacitor 140 has a first terminal connected to the second terminal of switch 130, and a second terminal connected to ground. Switch 150 has a first terminal connected to the second terminal of inductor 110, a second terminal for providing a power supply voltage labeled "$V_{OUT2}$", and a control terminal. Capacitor 160 has a first terminal connected to the second terminal of switch 150, and a second terminal connected to ground. Switching control block 170 has input terminals for receiving $V_{OUT1}$ and $V_{OUT2}$, and output terminals respectively connected to the control terminals of switches 120, 130, and 150.

Multiple output power supply 100 uses a boost topology to generate two output voltages, $V_{OUT1}$ and $V_{OUT2}$, using an inductor boost converter formed by inductor 110 and switch 120. Thus it avoids the need for an expensive transformer and multiple independent control loops. However it uses three switches, which will typically be implemented as discrete MOS power transistors. In addition, switching control block 170 implements a complex algorithm to coordinate switches 120, 130, and 150 to regulate $V_{OUT1}$ and $V_{OUT2}$ to desired levels.

Figure 2:
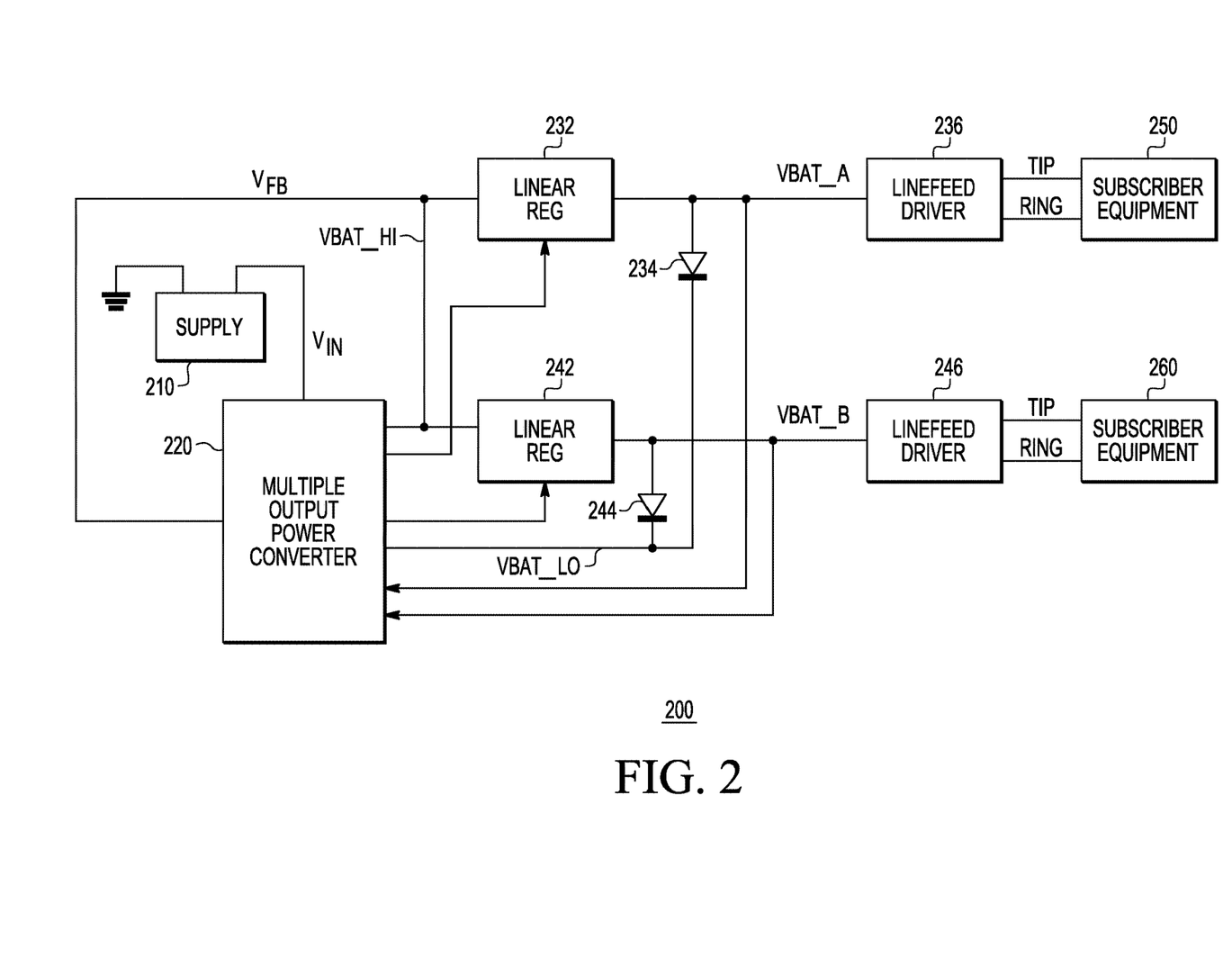
FIG. 2 illustrates in partial block diagram and partial schematic form a subscriber line interface circuit (SLIC) using a multiple output power converter according to various embodiments described herein.

FIG. 2 illustrates in partial block diagram and partial schematic form a subscriber line interface circuit (SLIC) 200 using a multiple output power converter 220 according to various embodiments described herein. SLIC 200 generally includes a supply 210, multiple output power converter 220, a linear regulator 232, a diode 234, a linefeed driver 236, a linear regulator 242, a diode 244, and a linefeed driver 246. Also shown in FIG. 2 is subscriber equipment 250 and subscriber equipment 260. Supply 210 is a power source such as an AC mains, a battery, and the like. Supply 210 provides an input voltage labeled "$V_{IN}$" for use in SLIC 200. Multiple output power converter 220 has a voltage input for receiving $V_{IN}$, a first power supply output for providing a voltage labeled "VBAT_HI", a second power supply output for providing a voltage labeled VBAT_LO, a feedback input for receiving a voltage labeled "$V_{FB}$", first and second control inputs for receiving voltages labeled "VBAT_A" and "VBAT_B", and first and second control outputs.

Linear regulator 232 has an input terminal for receiving VBAT_HI, a control input terminal connected to the first control output of multiple output power converter 220, and an output terminal for providing VBAT_A. Diode 234 has an anode connected to the output terminal of linear regulator 232, and a cathode connected the second power supply output of multiple output power converter 220. Linefeed driver 236 has a power supply input for receiving VBAT_A, and terminals labeled "TIP" and "RING" forming a subscriber loop with subscriber equipment 250.

Linear regulator 242 has an input terminal for receiving VBAT_HI, a control input terminal connected to the second control output of multiple output power converter 220, and an output terminal for providing VBAT_B. Diode 244 has an anode connected to the output terminal of linear regulator 242, and a cathode connected the second power supply output of multiple output power converter 220. Linefeed driver 246 has a power supply input for receiving VBAT_B, and TIP and RING terminals forming a subscriber loop with subscriber equipment 260.

SLIC 200 illustrates one possible circuit that uses multiple power supplies. In accordance with various embodiments described further below, multiple output power converter 220 provides multiple power supplies for use in SLIC 200 with lower cost than known solutions by avoiding the need for a transformer, and reducing the need for relatively expensive discrete components such as power transistors.

The control section of multiple output power converter 220 is conveniently implemented with other components of SLIC 200 such as codecs, filters, tone and ringing generators, etc. with the need for only a few, inexpensive discrete components. In other embodiments, multiple output power converter 220 may be implemented separately from the utilization circuit and with various combinations of integrated and discrete components.

Figure 3:
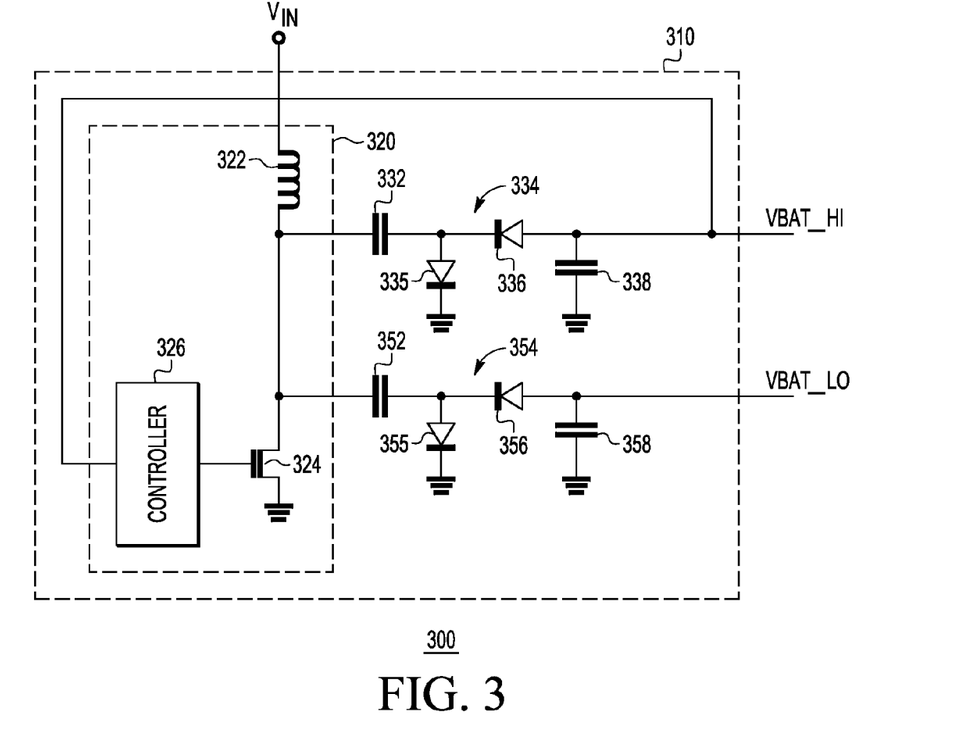
FIG. 3 illustrates in partial block diagram and partial schematic form a portion of a SLIC having a multiple output power converter according to one embodiment.

FIG. 3 illustrates in partial block diagram and partial schematic form a portion of a SLIC 300 having a multiple output power supply 310 according to one embodiment. Multiple output power supply 310 generally includes an inductive converter 320, a capacitor 332, a passive rectifier 334, a capacitor 338, a capacitor 352, a passive rectifier 354, and a capacitor 358.

Inductive converter 320 is in the inverting boost configuration and includes an inductor 322, a transistor 324, and a controller 326. Inductor 322 has a first terminal for receiving $V_{IN}$, and a second terminal. Transistor 324 has a first current electrode connected to the second terminal of inductor 322, a control electrode, and a second current electrode connected to ground. Controller 326 has an input for receiving a feedback signal, and an output connected to the control electrode of transistor 324.

Capacitor 332 has a first terminal connected to the second terminal of inductor 322, and a second terminal. Passive rectifier 334 includes a diode 335 and a diode 336. Diode 335 has an anode connected to the second terminal of capacitor 332, and a cathode connected to ground. Diode 336 has a cathode connected to the second terminal of capacitor 332, and an anode for providing VBAT_HI. Capacitor 338 has a first terminal connected to the anode of diode 336, and a second terminal connected to ground.

Capacitor 352 has a first terminal connected to the second terminal of inductor 322, and a second terminal. Passive rectifier 354 includes a diode 355 and a diode 356. Diode 355 has an anode connected to the second terminal of capacitor 352, and a cathode connected to ground. Diode 356 has a cathode connected to the second terminal of capacitor 352, and an anode for providing VBAT_LO. Capacitor 358 has a first terminal connected to the anode of diode 356, and a second terminal connected to ground.

In operation, multiple output power supply 310 is a shared tracking supply that generates two power supply voltages, VBAT_HI and VBAT_LO. Inductive converter 320 is in the inverting boost configuration. VBAT_HI is a negative voltage with respect to ground, and is more-negative (i.e. boosted higher) than VBAT_LO. Inductive converter 320 receives VBAT_HI as a feedback signal and regulates the switching of transistor 324 based on a deviation of VBAT_HI (or a fraction thereof) from a reference voltage. In some embodiments, controller 326 includes an integrated circuit switching regulator that operates using a much smaller power supply voltage, and VBAT_HI is reduced in magnitude before comparing it against the reference voltage. Controller 326 can achieve this reduction either using discrete resistors or resistors integrated on the integrated circuit. Note that FIG. 3 omits additional details related to the operation of controller 326 that are well known in the art. For example, controller 326 may implement current mode control by receiving inputs to measure the voltage across a reference resistor connected to the second current electrode of transistor 324 to determine the amount of current flowing through transistor 324.

Multiple output power supply 310 uses a relatively small number of components to provide two power supply voltages. In particular, it uses inductor 322 instead of an expensive multiple winding transformer. It also generates two power supplies at different voltage levels using one inductive converter 320. Moreover, rectifiers 334 and 354 are passive rectifiers using inexpensive diodes rather than more expensive switching transistors. Because rectifiers 334 and 354 are passive, controller 326 need not implement complex switching algorithms and it can be integrated with other circuits such as codecs, filters, tone and ringing generators, and the like on a low-cost SLIC chip.

Figure 4:
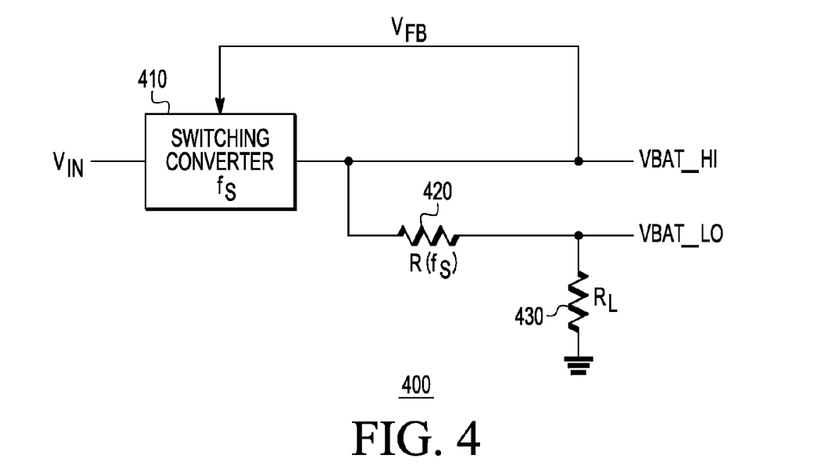
FIG. 4 illustrates in partial block diagram and partial schematic form an electrical model of the multiple output power converter of FIG. 3.

FIG. 4 illustrates in partial block diagram and partial schematic form an electrical model 400 of multiple output power supply 310 of FIG. 3. In electrical model 400, a switching converter 410 operating at a frequency of fs receives $V_{IN}$ and outputs VBAT_HI, using VBAT_HI as a feedback signal labeled "$V_{FB}$". Capacitor 352 operates as a switched capacitor modeled as a resistor 420 with an equivalent resistance that is a function of fs, shown as R(fs) in FIG. 4. In this case VBAT_LO is determined by the ratio of the equivalent resistance of resistor 420 and a load resistance 430 labeled "$R_L$". Assuming the load is predominantly resistive, $$\text{VBAT\_LO} = \text{VBAT\_HI} * \frac{R(fs)}{RL} \quad [1]$$

The value of R(fs) is determined by both the capacitance and the switching frequency:

$$R(fs) = \frac{1}{C \cdot fs} \quad [2]$$

where C is the capacitance of capacitor 352. Thus by careful choice of the capacitance and/or the switching frequency, the user can set the value of VBAT_LO to a desired value relative to VBAT_HI.

Figure 5:
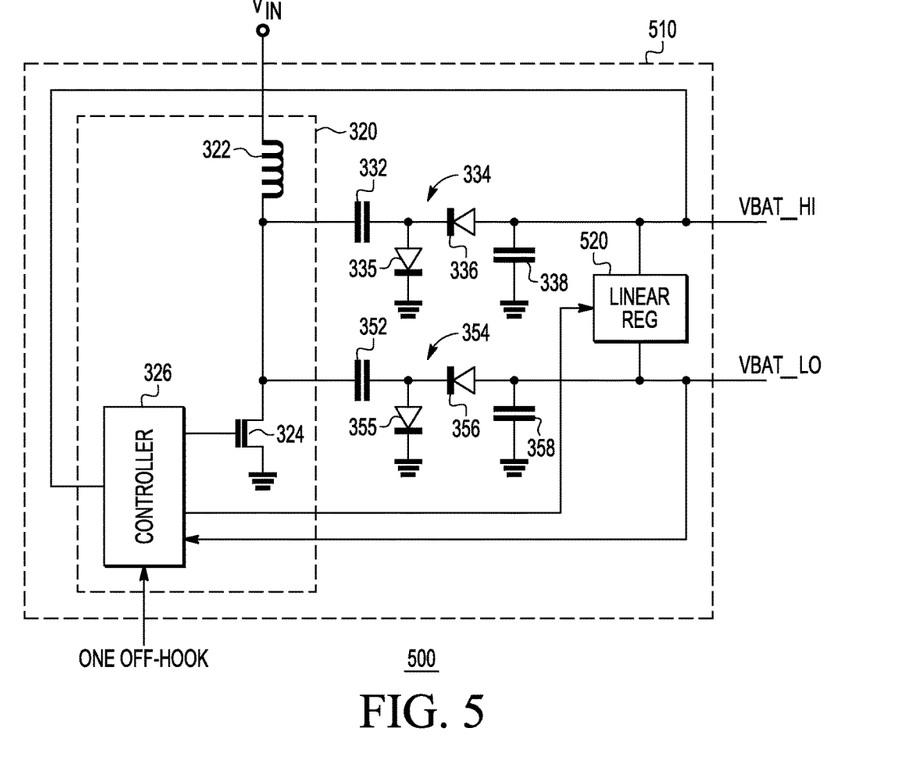
FIG. 5 illustrates in partial block diagram and partial schematic form a portion of a SLIC having a multiple output power converter according to another embodiment.

FIG. 5 illustrates in partial block diagram and partial schematic form a portion of a SLIC 500 having a multiple output power supply 510 according to another embodiment. This power supply is similar to multiple output power supply 310 of FIG. 3 but has two differences. First, it includes a linear regulator 520 having an input terminal connected to the anode of diode 336, an output terminal connected to the anode of diode 356, and a control terminal. Controller 326 is modified to add an additional output connected to the control terminal of linear regulator 520 to regulate the difference between VBAT_HI and VBAT_LO. The addition of linear regulator 520 guarantees that multiple output power supply 510 is able to provide enough power to the load connected to VBAT_LO.

Second, controller 326 adjusts switching frequency fs to regulate R(fs) in response to the difference between VBAT_LO and a reference voltage. In typical switch mode power supplies, the oscillator frequency is on the order of one to several hundred kilohertz (kHz). Under this assumption, the overall stability of multiple output power supply 510 will not be affected by the addition of an extra control loop because the main regulation loop from VBAT_HI through controller 326, transistor 324, capacitor 332, and rectifier 334 would have a much higher bandwidth than this additional frequency setting control loop.

In one embodiment, controller 326 further has an input for receiving a signal labeled "ONE OFF-HOOK" that operates as a regulation control signal. In this embodiment, a signal processor of SLIC 200 (not shown) detects an off-hook condition in one but not both of two available channels. The signal processor detects the off-hook condition in a channel by sensing the state of the TIP and RING terminals for that channel. Controller 326 operates the VBAT_LO control loop to adjust fs (and hence R(fs)) when the ONE OFF-HOOK signal is active but does not operates the VBAT_LO control loop to adjust fs when the ONE OFF-HOOK signal is inactive. Since SLIC 200 uses VBAT_HI for both channels when they are off-hook, and consumes little power when both channels are on-hook, this feature allows controller 326 to operate the VBAT_LO control loop only when both VBAT_HI and VBAT_LO are needed.

Figure 6:
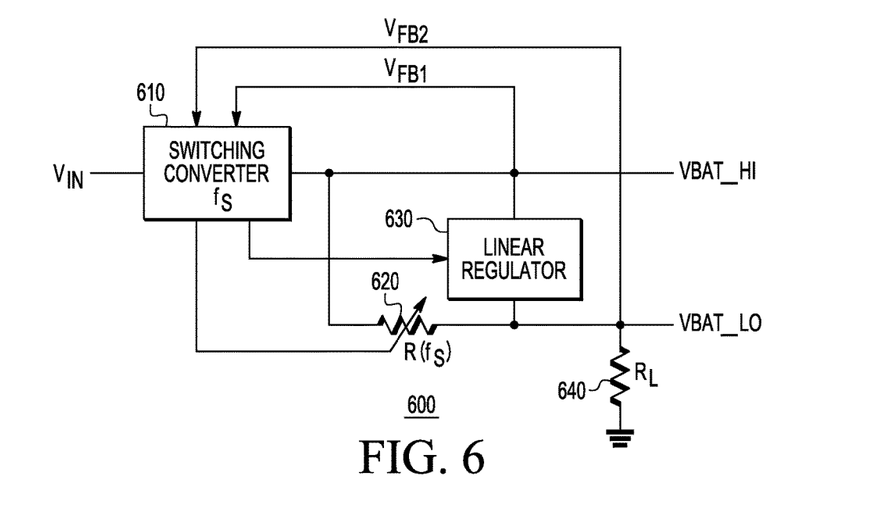
FIG. 6 illustrates in partial block diagram and partial schematic form an electrical model of the multiple output power converter of FIG. 5.

FIG. 6 illustrates in partial block diagram and partial schematic form an electrical model 600 of multiple output power supply 510 of FIG. 5. In electrical model 600, a switching converter 610 operating at a variable frequency of fs receives $V_{IN}$ and outputs VBAT_HI, using VBAT_HI as a first feedback signal labeled "$V_{FB1}$" for the main regulation loop. Capacitor 352 operates as a switched capacitor modeled as a resistor 620 whose resistance is a function of fs, shown as R(fs) in FIG. 6. Switching converter 610 also receives VBAT_LO as a second feedback signal labeled "$V_{FB2}$", and controls the resistance of resistor 620 by changing the switching frequency in response. A linear regulator 630 regulates the difference between VBAT_HI and VBAT_LO in response to a control signal from switching converter 610.

Figure 7:
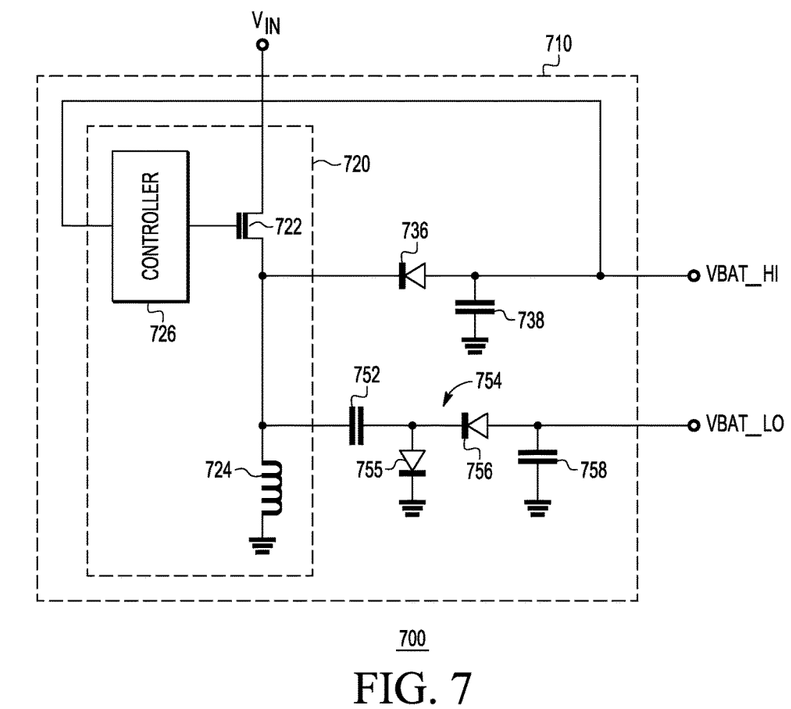
FIG. 7 illustrates in partial block diagram and partial schematic form a portion of a SLIC having a multiple output power converter according to yet another embodiment.

FIG. 7 illustrates in partial block diagram and partial schematic form a portion of a SLIC 700 having a multiple output power supply 710 according to yet another embodiment. Multiple output power supply 710 generally includes an inductive converter 720, a diode 736, a capacitor 738, a capacitor 752, a passive rectifier 754, and a capacitor 758.

Inductive converter 720 is in the boost/buck configuration and includes a transistor 722, an inductor 724, and a controller 726. Transistor 722 has a first current electrode for receiving $V_{IN}$, a control electrode, and a second current electrode. Inductor 322 has a first terminal connected to the second current electrode of transistor 722, and a second terminal connected to ground. Controller 726 has an input for receiving a feedback signal, and an output connected to the control electrode of transistor 722.

Diode 736 has a cathode connected to the second current electrode of transistor 722, and an anode for providing VBAT_HI. Capacitor 738 has a first terminal connected to the anode of diode 736, and a second terminal connected to ground.

Capacitor 752 has a first terminal connected to the second current electrode of transistor 722, and a second terminal. Passive rectifier 754 includes a diode 755 and a diode 756. Diode 755 has an anode connected to the second terminal of capacitor 752, and a cathode connected to ground. Diode 756 has a cathode connected to the second terminal of capacitor 752, and an anode for providing VBAT_LO. Capacitor 758 has a first terminal connected to the anode of diode 756, and a second terminal connected to ground.

Multiple output power supply 710 illustrates the use of different forms of inductive converters. In addition to the inverting boost and inverting boost/buck configurations described in FIGS. 3 and 7, respectively, a multiple output power supply as described herein can be used in the buck configuration, the noninverting boost configuration, and any other similar configuration. Moreover the multiple output power supply can use a linear regulator between the supplies to provide further power, and/or can regulate VBAT_LO by modulating the switching frequency, in these various configurations.

A multiple output power supply according to the various embodiments described above is especially useful in applications that require multiple independent power supplies, for example in SLICs with multiple subscriber loops. In such applications, the controller can be conveniently combined with other components in a low-cost integrated circuit with a small number of external components requiring a small amount of printed circuit board space. Thus the multiple output power converter described herein is cheaper than other known implementations.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A circuit with a multiple output power converter comprising:
    an inductive converter having a voltage input terminal for receiving an input voltage, and a voltage output terminal, wherein said inductive converter comprises a single inductor;
    a first passive rectifier having an input coupled to said voltage output terminal of said inductive converter, and an output for providing a first power supply voltage;
    wherein said inductive converter further comprises a controller coupled to said output of said first passive rectifier for modulating current through said single inductor at a switching frequency to regulate said first power supply voltage to a desired value;
    a first capacitor having a first terminal coupled to said voltage output terminal of said inductive converter, and a second terminal; and
    a second passive rectifier having an input coupled to said second terminal of said first capacitor, and an output terminal for providing a second power supply voltage different from said first power supply voltage, said second passive rectifier alternatively coupling said second terminal of said first capacitor to an output node and to a reference voltage terminal at said switching frequency.

2. The circuit of claim 1 wherein said multiple output power converter further comprises:
    a first linear regulator coupled between said outputs of said first and second passive rectifiers.

3. The circuit of claim 1 wherein said inductive converter is an inverting boost converter and comprises:
    an inductor having a first terminal for receiving said input voltage, and a second terminal;
    a transistor having a first terminal coupled to said second terminal of said inductor, a control terminal for receiving a switching control signal, and a second terminal coupled to a reference voltage terminal; and
    a controller having a control terminal for receiving a first feedback signal, and an output terminal for providing said switching control signal, wherein said controller changes a duty cycle of said switching control signal based on said feedback signal.

4. The circuit of claim 3 wherein the circuit generates said first feedback signal in response to said first power supply voltage.

5. The circuit of claim 3, wherein said controller further has a second control terminal for receiving a second feedback signal, wherein said controller adjusts a frequency of said switching control signal in response to said second feedback signal.

6. The circuit of claim 5, wherein the circuit generates said second feedback signal in response to said second power supply voltage.

7. The circuit of claim 5, wherein the circuit adjusts said frequency of said switching control signal in response to said second feedback signal only when a regulation control signal is active.

8. The circuit of claim 1 further comprising:
    a second linear regulator having an input for receiving said first power supply voltage, and an output; and
    a first subscriber line interface circuit (SLIC) linefeed driver having an power supply terminal coupled to said output of said second linear regulator, and having a tip terminal and a ring terminal.

9. The circuit of claim 8 further comprising:
    a third linear regulator having an input for receiving said first power supply voltage, and an output;
    a second SLIC linefeed driver having a power supply terminal coupled to said output of said third linear regulator, and having a tip terminal and a ring terminal;
    a first diode having a cathode for receiving said second power supply voltage, and an anode coupled to said output of said second linear regulator; and
    a second diode having a cathode for receiving said second power supply voltage, and an anode coupled to said output of said third linear regulator.

10. A circuit with a multiple output power converter comprising:
    an inductive converter having a voltage input terminal for receiving an input voltage, and an output terminal, wherein said inductive converter comprises a single inductor;
    a first passive rectifier having an input coupled to said output terminal of said inductive converter, and an output for providing a first power supply voltage;
    wherein said inductive converter further comprises a controller coupled to said output of said first passive rectifier for modulating current through said single inductor at a switching frequency to regulate said first power supply voltage to a desired value;

a first capacitor having a first terminal coupled to said output terminal of said inductive converter, and a second terminal;

a second passive rectifier having an input coupled to said second terminal of said first capacitor, and an output terminal for providing a second power supply voltage different from said first power supply voltage, said second passive rectifier alternatively coupling said second terminal of said first capacitor to an output node and to a reference voltage terminal at said switching frequency; and a linear regulator having an input terminal coupled to said output terminal of said first passive rectifier, and an output terminal coupled to said output terminal of said second passive rectifier.

11. The circuit of claim 10 further comprising:

a first capacitor coupled between said output terminal of said inductive converter, and said input of said second passive rectifier.

12. The circuit of claim 11 further comprising:

a second capacitor having a first terminal coupled to said output terminal of said second passive rectifier, and a second terminal coupled to a reference voltage terminal.

13. The circuit of claim 10 wherein said inductive converter is an inverting boost converter and comprises:

said single inductor having a first terminal for receiving said input voltage, and a second terminal;

a transistor having a first terminal coupled to said second terminal of said single inductor, a control terminal for receiving a switching control signal, and a second terminal coupled to a reference voltage terminal; and a controller having a control terminal for receiving a first feedback signal, and an output terminal for providing said switching control signal, wherein said controller changes a duty cycle of said switching control signal based on said first feedback signal.

14. The circuit of claim 13 wherein:

said linear regulator further has an adjustment input terminal for receiving an adjustment signal, and provides a voltage on said output terminal in response to said adjustment signal.

15. The circuit of claim 10 further comprising:

a subscriber line interface circuit (SLIC) line driver for receiving said first power supply voltage and having a tip terminal and a ring terminal.

16. A method comprising:

modulating current through a single inductor at a switching frequency based on a feedback signal to generate a first boosted voltage on an output terminal;

passively rectifying said first boosted voltage to provide a first power supply voltage;

wherein said modulating comprises regulating said first power supply voltage to a desired value in response to said feedback signal;

providing said feedback signal in response to said first power supply voltage;

capacitively coupling said first boosted voltage to an internal node to provide a second boosted voltage;

alternatively coupling said internal node to an output node and to a reference voltage terminal at said switching frequency; and providing a second power supply voltage in response a voltage on said internal node.

17. The method of claim 16 further comprising:

regulating a difference between said first power supply voltage and said second power supply voltage using a linear regulator.

18. The method of claim 16 further comprising:

regulating a frequency of said modulating based on said second power supply voltage.

19. The method of claim 16 further comprising:

using said first power supply voltage to drive an interface signal for a first subscriber line in a first mode.

20. The method of claim 19 further comprising:

using said second power supply voltage to drive said interface signal for said first subscriber line in a second mode.

* * * * *